United States Patent
Nelson

(10) Patent No.: US 10,342,212 B2
(45) Date of Patent: Jul. 9, 2019

(54) COLLAPSIBLE FEEDER

(71) Applicant: Cabela's LLC, Sidney, NE (US)

(72) Inventor: Ronald D. Nelson, Sidney, NE (US)

(73) Assignee: CABELA'S LLC, Sidney, NE (US)

( * ) Notice: Subject to any disclaimer, the term of this patent is extended or adjusted under 35 U.S.C. 154(b) by 0 days.

(21) Appl. No.: 15/852,112

(22) Filed: Dec. 22, 2017

(65) Prior Publication Data
US 2018/0116173 A1    May 3, 2018

Related U.S. Application Data

(62) Division of application No. 14/529,022, filed on Oct. 30, 2014, now Pat. No. 9,877,461.

(60) Provisional application No. 61/898,940, filed on Nov. 1, 2013.

(51) Int. Cl.
*A01K 39/014*    (2006.01)
*A01K 5/02*    (2006.01)
*A01M 31/00*    (2006.01)

(52) U.S. Cl.
CPC .......... *A01K 5/0225* (2013.01); *A01K 39/014* (2013.01); *A01M 31/008* (2013.01)

(58) Field of Classification Search
CPC ... A01K 5/0225; A01K 39/012; A01K 39/014
USPC ............... 119/57.91, 57.92, 65, 66, 67, 69
See application file for complete search history.

(56) References Cited

U.S. PATENT DOCUMENTS

| | | | |
|---|---|---|---|
| 4,518,106 A | 5/1985 | Lafleur | |
| 5,333,572 A | 8/1994 | Nutt | |
| 6,427,629 B1 | 8/2002 | Lush | |
| 7,028,635 B1 | 4/2006 | Eastman | |
| 7,185,605 B1 | 3/2007 | Lush | |
| 7,331,308 B1 | 2/2008 | Smith | |
| 7,484,475 B2 | 2/2009 | Milliner | |
| 2005/0126501 A1* | 6/2005 | Davis | A01K 5/0225 119/51.01 |
| 2005/0241588 A1 | 11/2005 | Foster | |

OTHER PUBLICATIONS

Notice of Allowance U.S. Appl. No. 14/529,022 dated Oct. 3, 2017.
Final Office Action U.S. Appl. No. 14/529,022 dated May 17, 2017.
(Continued)

*Primary Examiner* — Trinh T Nguyen
(74) *Attorney, Agent, or Firm* — Pillsbury Winthrop Shaw Pittman LLP

(57) ABSTRACT

A deer feeder includes an upper enclosure, a collapsible middle sleeve, a bottom enclosure, and a feed distribution mechanism. At least three support members may be attached to the upper enclosure for holding the deer feeder in a vertical position. The upper enclosure, collapsible middle sleeve, and bottom enclosure may form a feed storage area that is rainproof. The feed storage area may be made rainproof by attaching a top opening of the collapsible middle sleeve to an inner wall of the upper enclosure and a bottom opening of the collapsible middle sleeve to an outer wall of the bottom enclosure. The feed distribution mechanism may include an auger for removing feed from the feed storage area and/or a centrifugal force mechanism for dispersing feed around the deer feeder.

21 Claims, 10 Drawing Sheets

(56) References Cited

OTHER PUBLICATIONS

Non-Final Office Action U.S. Appl. No. 14/529,022 dated Nov. 4, 2016.
GSM Outdoors news page "American Hunter Introduces New Collapsible Bag Feeder with Digital Timer Kit", Apr. 2014, from gsmoutdoors.com website [online] [retrieved on Feb. 16, 2015], 4 pages, Retrieved from <URL: http://www.gsmoutdoors.com/news/2014/4/21/american-hunter-introduces-new-collapsible-bag-feeder-with-digital-timer-kit/>.
The Home Depot product page for American Hunter 1.2 gal. Bag Portable Feeder with Digital Timer Kit from homedepot.com website [online] [retrieved on Feb. 12, 2015], 1 page, Retrieved from <URL: http://www.homedepot.com/p/American-Hunter-11-2-gal-bag-portable-feeder-with-digital-timer-kit-ah-bagkit/2056454343?keyword=american+hunter+11.2+gab+portable>.

\* cited by examiner

COLLAPSIBLE FEEDER

CROSS-REFERENCE TO RELATED PATENT APPLICATION

This application is a Divisional Application of U.S. Ser. No. 14/529,022, filed Oct. 30, 2014, which claims priority to provisional patent application U.S. Ser. No. 61/898,940 filed Nov. 1, 2013. The subject matter of each is incorporated herein by reference in entirety.

FIELD OF THE INVENTION

The disclosure relates in general to a feeder and, more particularly, to a deer feeder that is collapsible, thereby reducing its size and improving its portability.

BACKGROUND

Deer feeders may be used to attract wild game, such as moose, elk, and deer, to a known hunting location. Feed is stored within a feed storage area of the deer feeder and then dispersed within the hunting location.

Deer feeders with small feed storage areas are easier to transport from a manufacturer to a distributor, from a distributor to an end user, and from the end user to the hunting location. However, deer feeders with small feed storage areas do not hold as much feed and require more frequent feed replacement.

On the other hand, deer feeders with large feed storage areas allow for a greater amount of feed to be stored and dispersed over longer periods of time, thereby increasing the effectiveness of the deer feeder and requiring less frequent feed replacement. However, deer feeders with a large feed storage area are much more difficult to transport.

BRIEF SUMMARY

The disclosure relates in general to deer feeders and, more particularly, to a deer feeder that is collapsible. The deer feeder in the open or extended state has a large feed storage area, while the same deer feeder in the collapsed state is easy to transport.

In an example embodiment, a deer feeder may include an upper enclosure, a collapsible sleeve, a bottom enclosure, and a feed distribution mechanism. In this embodiment, the collapsible sleeve has a top opening which is connected to the upper enclosure and a bottom opening which is connected to the bottom enclosure. The upper enclosure, the collapsible sleeve, and the bottom enclosure preferably form a feed storage area that is rainproof.

Various methods may be used to hold the deer feeder in a vertical position. As non-limiting examples, the deer feeder may be attached to a tree, hung from a tree branch, or three or four support members may be attached to the upper enclosure. This allows the collapsible sleeve to fully open or extend by the force of gravity, thereby forming a large feed storage area within the deer feeder.

In a preferred embodiment, the feed distribution mechanism may include an auger for removing feed from the feed storage area and/or a centrifugal force mechanism for distributing feed from the feed storage area to a selected hunting location around the deer feeder. Gravity may be used to move the feed to the bottom of the feed storage area.

In another preferred embodiment, the top opening of the sleeve may be connected to an inner wall of the top enclosure and the bottom opening of the sleeve may be connected to an outer wall of the bottom enclosure to create a rainproof feed storage area.

The deer feeder may be easily transported by collapsing the sleeve of the deer feeder to reduce the size of the deer feeder. In the collapsed state, the deer feeder may then be easily transported to a desired location. For example, a hunter may transport the deer feeder to a selected hunting location with the sleeve collapsed and then expand the collapsible sleeve of the deer feeder at the selected hunting location to increase the size of the feed storage area within the deer feeder during actual use.

DETAILED DESCRIPTION OF THE DRAWINGS

Figure 5:
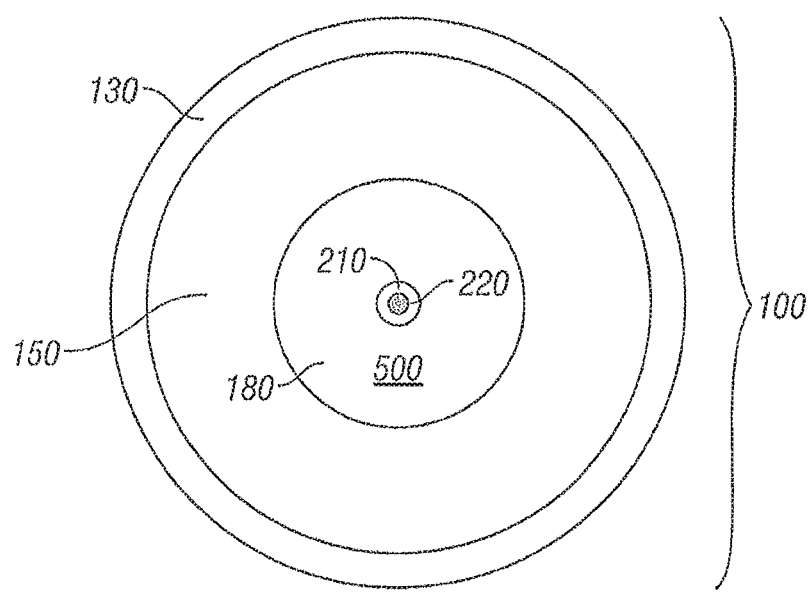
FIG. 5 shows a view looking down into a feed storage area of the deer feeder.

The disclosure relates in general to feeders and, more particularly, to a deer feeder that may be 1) collapsed (shown in FIG. 2) to improve its portability or 2) extended (shown in FIG. 1) to create a large feed storage area 500 (shown in FIG. 5). A deer feeder 100 may include an upper enclosure 105, a collapsible sleeve 150, a bottom enclosure 180, and a feed distribution mechanism 200. The upper enclosure 105, the collapsible sleeve 150, and the bottom enclosure 180 may form a rainproof feed storage area 500 for storing feed. A rainproof feed storage area 500 prevents water from entering the feed storage area 500 and spoiling the feed.

The upper enclosure 105 may be generally shaped as a circular disk or bowl and form a lid to feeder 100. The upper enclosure 105 may have a smooth inner wall that may be used to make a water tight seal with a top opening of the collapsible sleeve 150.

The upper enclosure 105 may be made of any material, but can be made of, as non-limiting examples, plastic, fiberglass, graphite, PVC, wood, metal, or any combination thereof. The materials used for the upper enclosure are preferably strong, light weight and rainproof.

Figure 3:
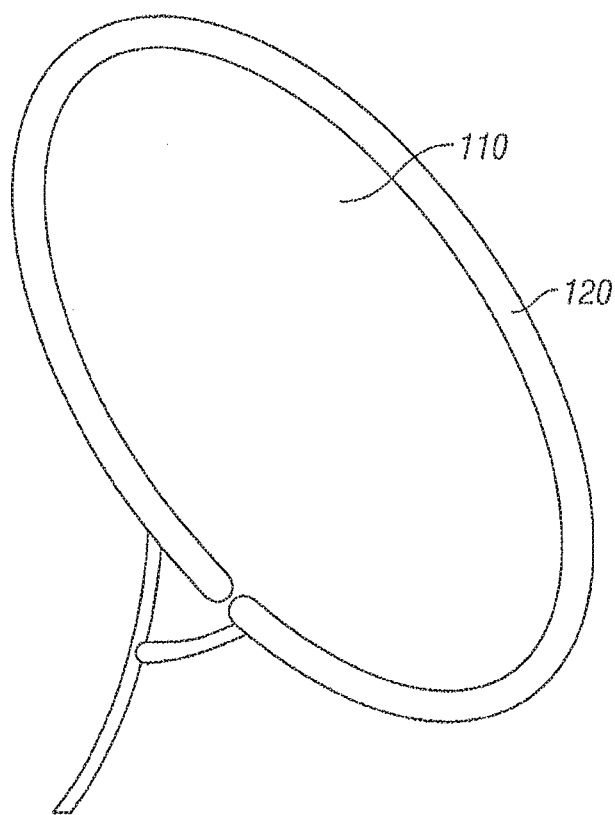
FIG. 3 shows a removable cover and an attachment apparatus, which may be components of an upper enclosure shown in FIG. 1.

The upper enclosure 105 may be constructed from one or more elements. As shown in FIG. 3, and as a non-limiting example, the upper enclosure 105 may include a generally cylindrically shaped ring section 130 (not shown in FIG. 3), a removable cover 110, and an attachment apparatus 120 (such as a clamp) for connecting the cylindrically shaped ring section 130 and the removable cover no. This configuration allows the removable cover no to be removed from the deer feeder 100 to add feed to a feed storage area 500 or the removable cover no may be attached to the deer feeder 100 to make the feed storage area 500 rainproof.

Figure 1:
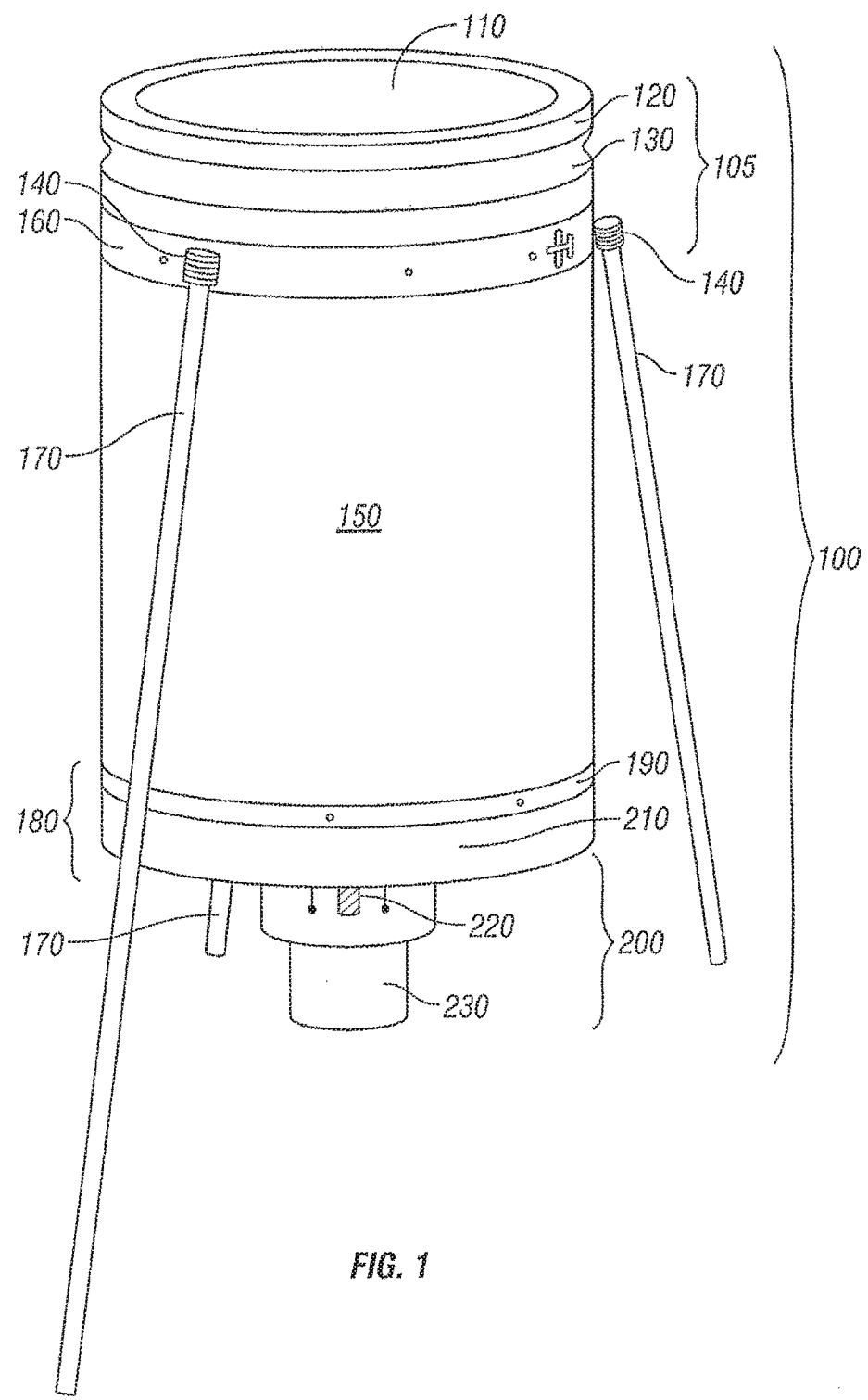
FIG. 1 shows a deer feeder with a collapsible sleeve and support three members holding the deer feeder in a vertical position, with the collapsible sleeve not collapsed, i.e., the collapsible sleeve is in an open or extended position.

The upper enclosure 105 may have one or more attachments that permit the deer feeder 100 to be attached to a tree or hung from a branch of a tree. Alternatively, or in addition, the upper enclosure 105 may have a number of receptacles 140 to receive support members 170 to hold the deer feeder 100 in a vertical position during use (this configuration is shown in FIG. 1).

The collapsible sleeve 150 may be generally shaped as a hollow cylinder or tube made from any collapsible, foldable, or compressible material, and can be made of, as non-limiting examples, tarpaulin (tarp), canvas, cloth, rubber, or any other durable collapsible, foldable or compressible material. In a preferred embodiment, the collapsible sleeve 150 is made of a material that is easily cleanable so that, after use, the feed storage area may be easily cleaned with a water hose.

In some embodiments, the collapsible sleeve 150 may be tapered so that the top opening is larger than the bottom opening of the collapsible sleeve 150. This embodiment helps direct the feed to the center of the bottom enclosure 180 right above the feed distribution mechanism 200. In other embodiments, the collapsible sleeve 150 has vertical walls with no taper. This embodiment helps to prevent feed from getting stuck to the inside walls of the collapsible sleeve 150.

Alternatively, the collapsible sleeve 150 may be made of a plurality of interlocking collapsible rings that may be telescoped into either a compressed mode (collapsed) or a fully extended mode that would increase the size of the feed storage area 500.

The collapsible sleeve 150 preferably has a top opening sealed to a smooth inner wall of the upper enclosure 105 and a bottom opening sealed to a smooth outer wall of the bottom enclosure 180. The collapsible sleeve 150 may be connected to the upper enclosure 105 and the bottom enclosure 180 by any method now known or developed in the future. As specific non-limiting examples, the upper seal 160 may be made using glue, adhesives, sonic welding, rivets, clamps, or any other method for attaching one material to another material. In a preferred embodiment, the upper seal 160 is a water tight seal. A water tight upper seal 160 between the collapsible sleeve 150 and the upper enclosure 105 and a water tight bottom seal 190 between the collapsible sleeve 150 and the bottom enclosure 180 has the benefit of making the feed storage area 500 rainproof.

Figure 6:
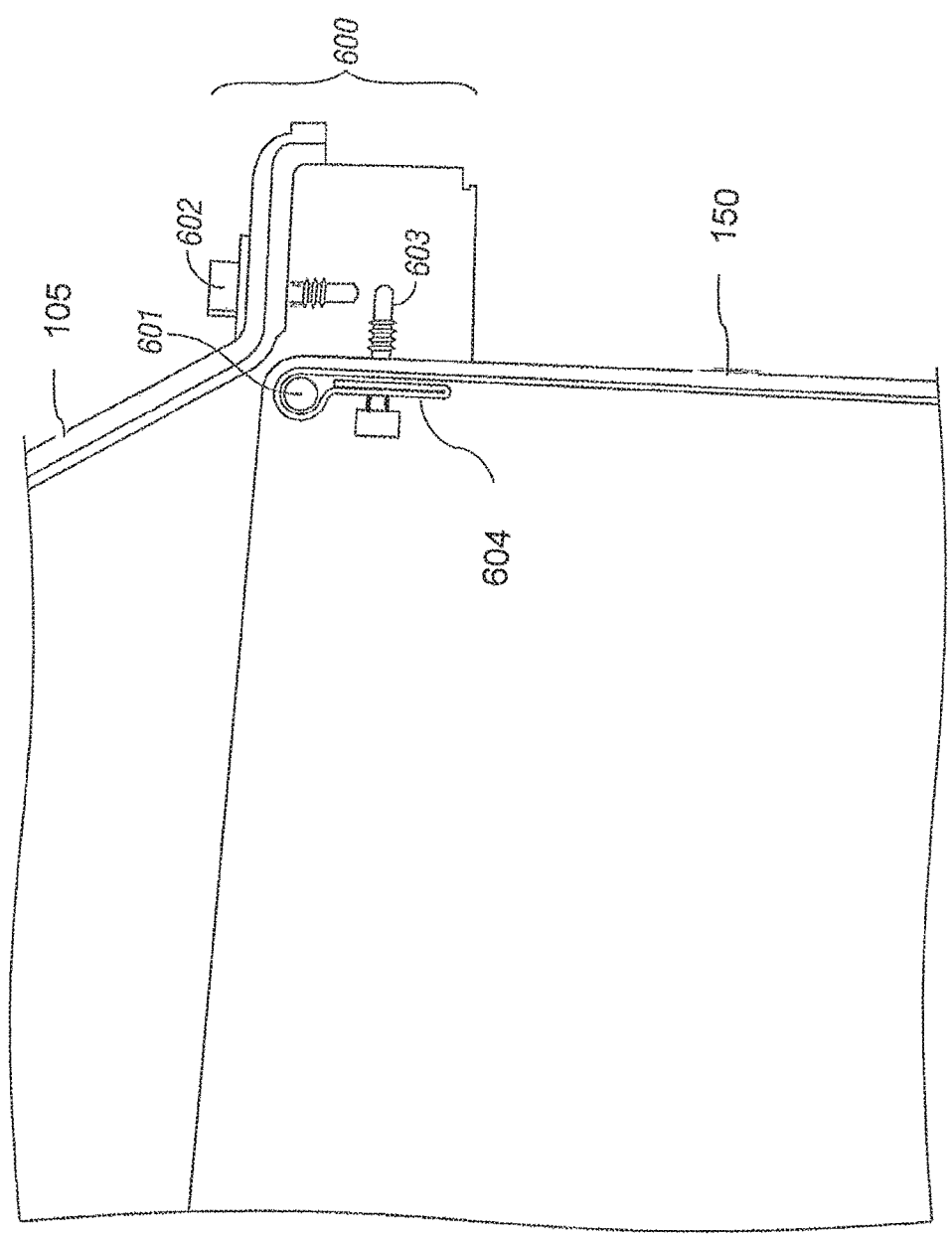
FIG. 6 shows an example apparatus for connecting an upper enclosure with a collapsible sleeve.

FIG. 6 is a cross section view that illustrates a non-limiting example of a top secure connection 600 for connecting an upper enclosure 105 with a collapsible sleeve 150. In this embodiment, the top secure connection 600 may be made between the upper enclosure 105 and the collapsible sleeve 150. The collapsible sleeve 150 may be folded over or around a top round bar 601. The top secure connection 600 preferably extends over top round bar 601 to prevent leaks between the top secure connection 600 and the collapsible sleeve 150. The top round bar 601 may be made of any material, such as a metal, strong enough to support the weight of the feed in the feed storage area 500. The collapsible sleeve 150 may be sewn to itself with weld to make a watertight seal around the top round bar 601. A top flat bar ring 604, preferably facing inward, may be used to press and hold the collapsible sleeve 150 and/or the top round bar 601 in place against the secure connection 600 with a plurality of connection devices 603 (preferably screws). Connection devices 602 (preferably screws) may be used to connect the upper enclosure 105 with the top secure connection 600. This embodiment may allow the collapsible sleeve 150 to evenly pull down all the way around on the top round bar 601 which is held in place by the top flat bar ring 604. The top round bar 601 may support and evenly distribute the weight all the way around the collapsible sleeve 150, thereby reducing the maximum stress put on any one point on the collapsible sleeve 150. This may prevent the collapsible sleeve 150 from tearing.

The bottom enclosure 180 may be generally shaped as a circular disk or bowl and may be a base member. The bottom enclosure 180 preferably has a smooth outer wall that may be used to make a water tight seal with the bottom opening of the collapsible sleeve 150.

The bottom enclosure 180 may be made of any material, but is preferably made of, as non-limiting examples, plastic, fiberglass, graphite, PVC, wood, metal, or any combination thereof. The bottom enclosure 180 may include a hole or access port 210 that allows feed from the feed storage area 500 to travel to the feed distribution mechanism 200.

While the deer feeder 100 is not limited to any particular size, in a preferred embodiment the upper enclosure 105, collapsible sleeve 150, and bottom enclosure 180 are all about the same diameter and between six inches and three feet in diameter.

Figure 7:
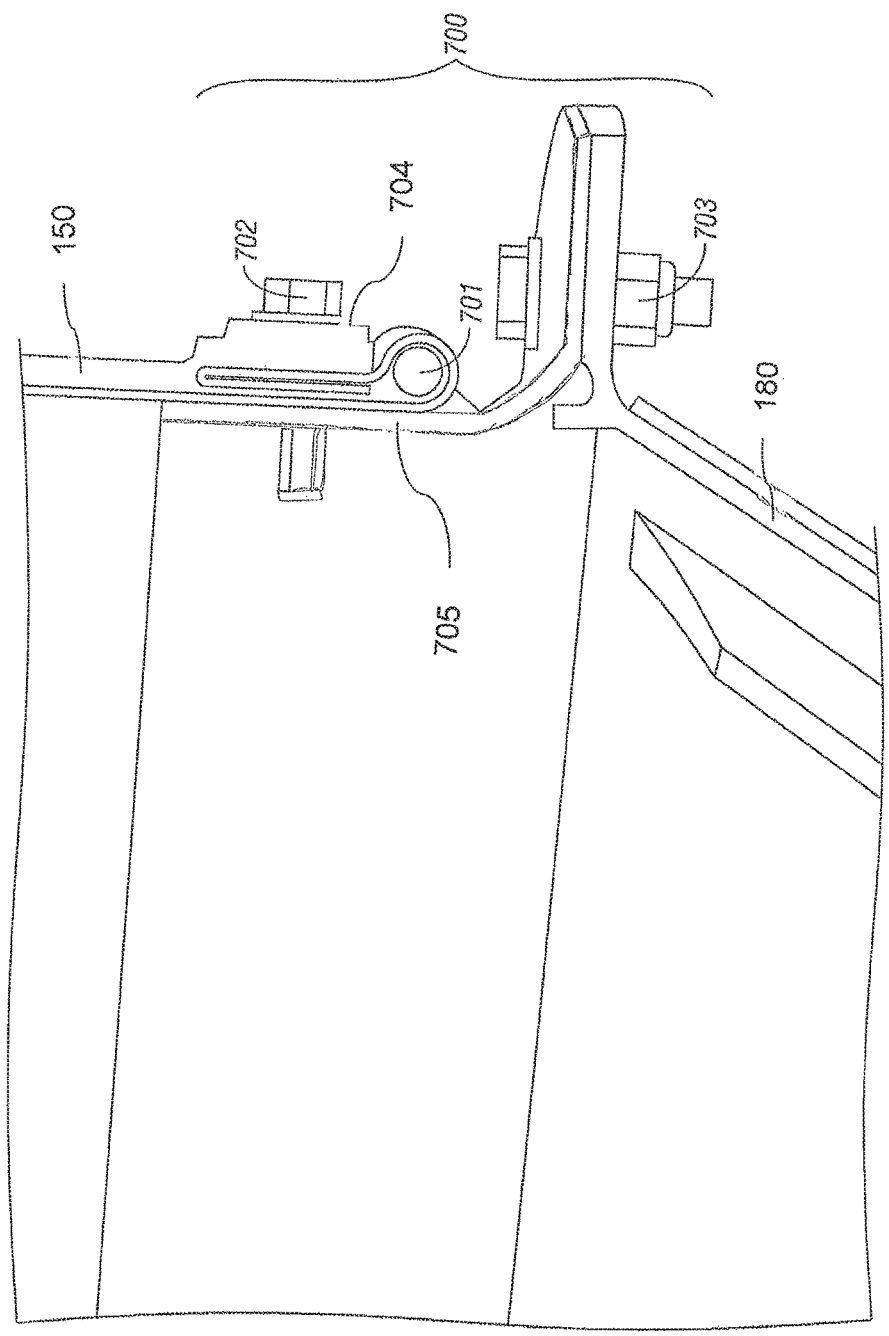
FIG. 7 shows an example apparatus for connecting a collapsible sleeve with a bottom enclosure.
Figure 8:
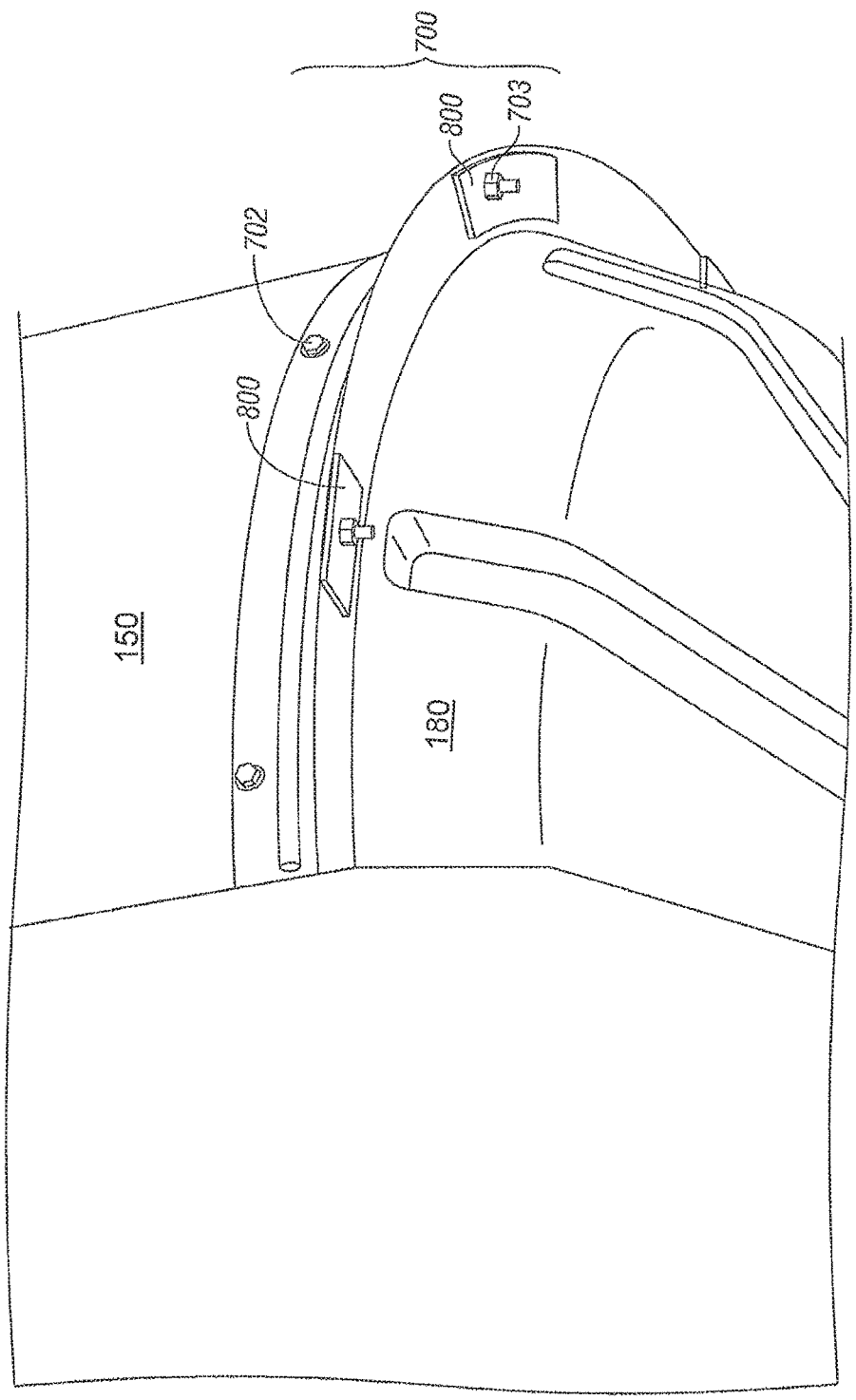
FIG. 8 shows an example apparatus for connecting a collapsible sleeve with a bottom enclosure.

FIGS. 7 and 8 are a cross section view that illustrate a non-limiting example of a bottom secure connection 700 for connecting a collapsible sleeve 150 with a bottom enclosure 180. In this embodiment, the bottom secure connection 700 may be made between the collapsible sleeve 150 and the bottom enclosure 180. The collapsible sleeve 150 may be folded over or around a bottom round bar 701. The bottom secure connection 700 preferably has a seal 705 to prevent leaks between the collapsible sleeve 150 and the bottom enclosure 180. The bottom round bar 701 may be made of any material, such as a metal, strong enough to support the weight of the feed in the feed storage area 500. The collapsible sleeve 150 may be sewn to itself with weld to make a watertight seal around the bottom round bar 701. A bottom flat bar ring 704, preferably facing outward, may be used to press and hold the collapsible sleeve 150 and/or the bottom round bar 701 in place against the bottom secure connection 700 with a plurality of connection devices 702. Connection devices 703 may be used to connect bottom enclosure 180 with seal 705 and collapsible sleeve 150. This embodiment may allow the collapsible sleeve 150 to evenly pull up all the way around the bottom round bar 701 which is held in place by the bottom flat bar ring 704. The bottom round bar 701 may support and evenly distribute the weigh all the way around the collapsible sleeve 150, thereby reducing the maximum stress put on any one point on the collapsible sleeve 150. This may prevent the collapsible sleeve 150 from tearing. FIG. 8 illustrates how a bottom washer 800 may be used to distribute the weight to prevent connection devices 703 from tearing through the bottom enclosure 180 or the bottom secure connection 700.

Figure 4:
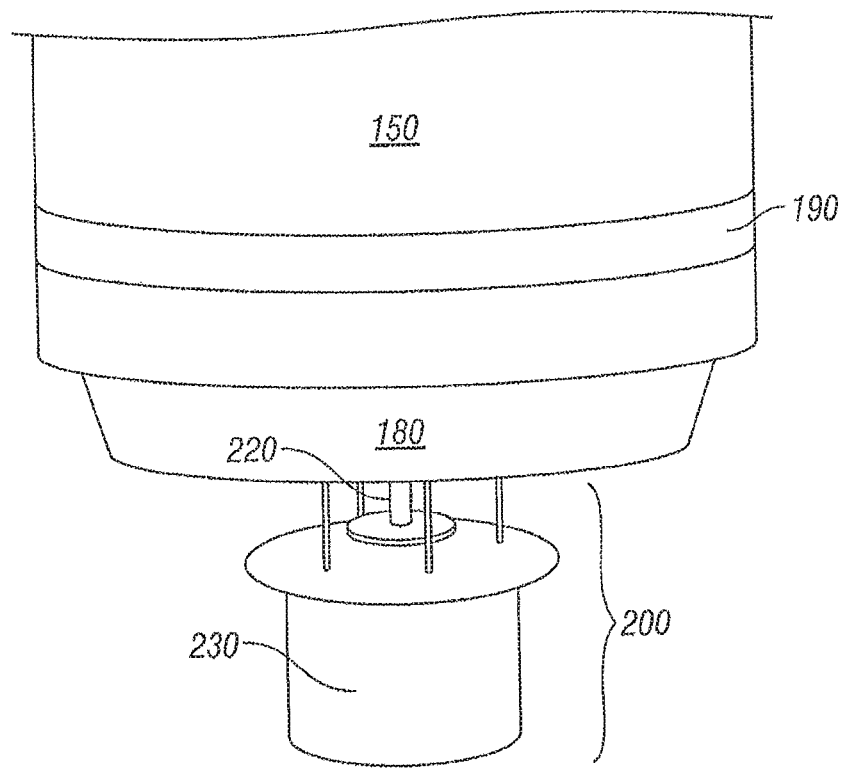
FIG. 4 shows part of a collapsible sleeve, a bottom enclosure, a mechanism for attaching the collapsible sleeve to the bottom enclosure, and a feed distribution mechanism.

As shown in FIG. 4, a feed distribution mechanism 200 may be attached to the bottom enclosure 180. The feed distribution mechanism 200 may remove or receive feed from the feed storage area 500 through the hole or access port 210 in the bottom enclosure 180 and distribute the feed to the area around the deer feeder 100. In a preferred embodiment, the feed distribution mechanism 200 includes an auger 220 for extracting feed from the feed storage area 500 and/or a centrifugal force mechanism 230 for distributing the feed around the deer feeder 100. Gravity may also be used to move the feed from the feed storage area 500 to the feed distribution mechanism 200.

Figure 2:
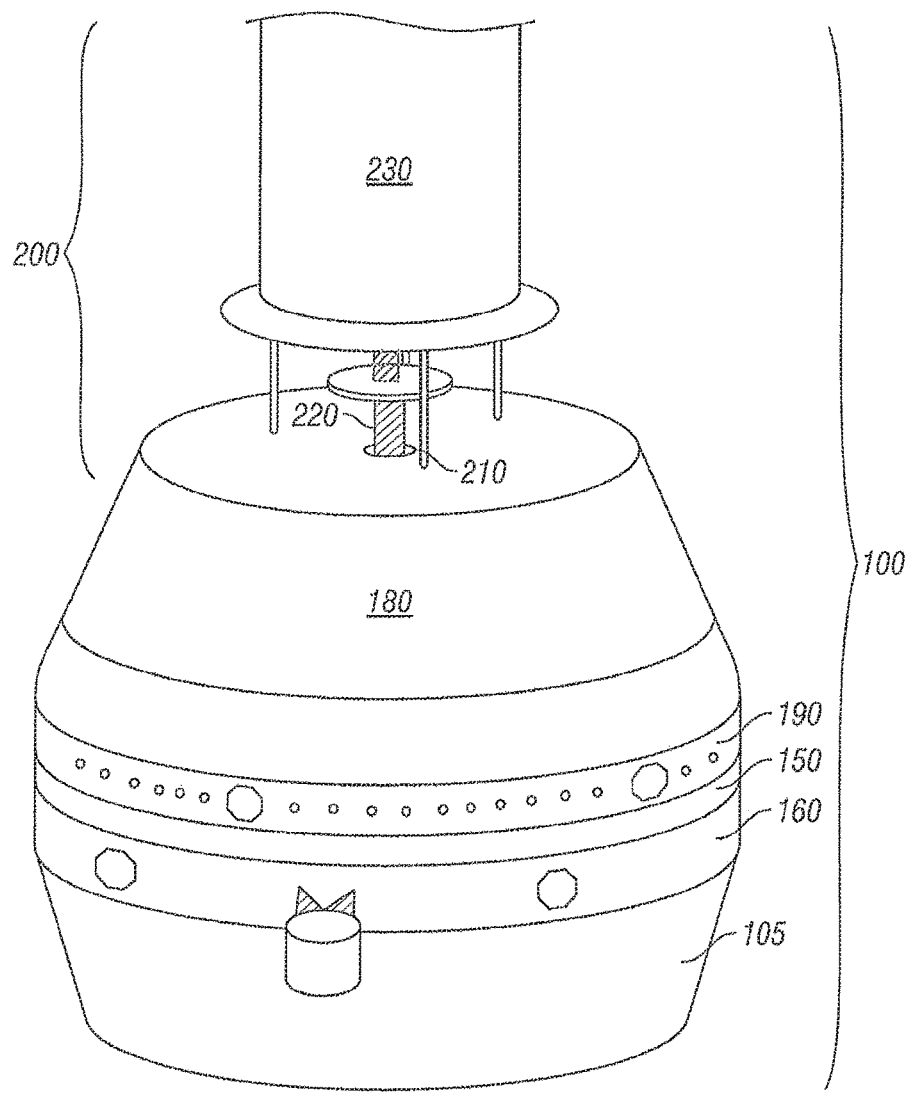
FIG. 2 shows a deer feeder upside down with the collapsible sleeve collapsed, i.e., the collapsible sleeve is in a closed or compressed position making it easier to store and/or transport.
Figure 9:
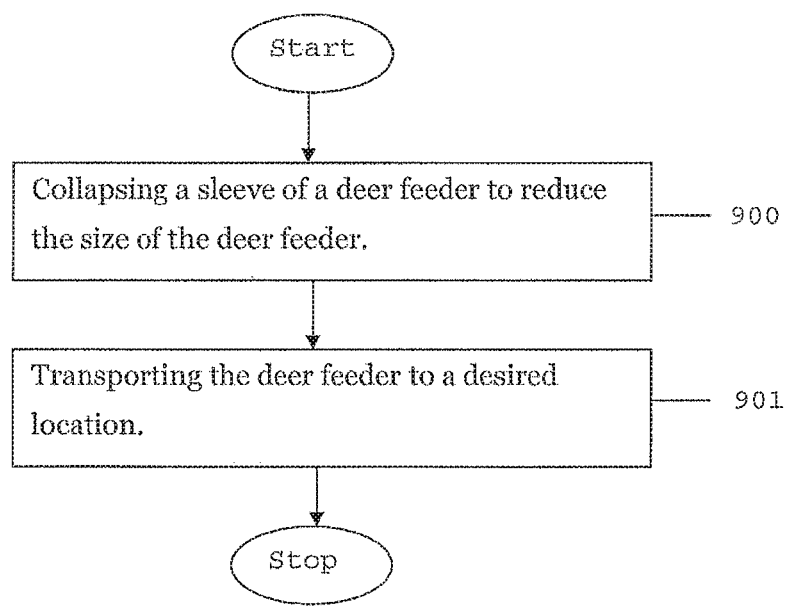
FIG. 9 shows a flowchart of one possible method of practicing the present invention.

A method for practicing the invention is shown in FIG. 9. The deer feeder 100 as described above has the advantage of being able to collapse the collapsible sleeve 150 thereby making the deer feeder 100 much smaller than the deer feeder 100 would be without a collapsible sleeve 150 (a upside-down deer feeder 100 with the collapsible sleeve collapsed is shown in FIG. 2). (Step 900)

Collapsing the collapsible sleeve 150 significantly increases the portability of the deer feeder 100 and reduces shipping costs from the manufacturer to the distributor, thereby making the deer feeder 100 cheaper to transport. It also makes it easier for the distributor to display the deer feeder 100 and for the end user to transport the deer feeder 100 from the distributor to the end user's home. In addition, the smaller size also makes it easier for the end user to transport the deer feeder 100 from the end user's home to a desired hunting location. This is particularly advantageous as the end user may have to carry, either by hand or by an all terrain vehicle, the deer feeder 100 to the desired hunting location. (Step 901)

Figure 10:
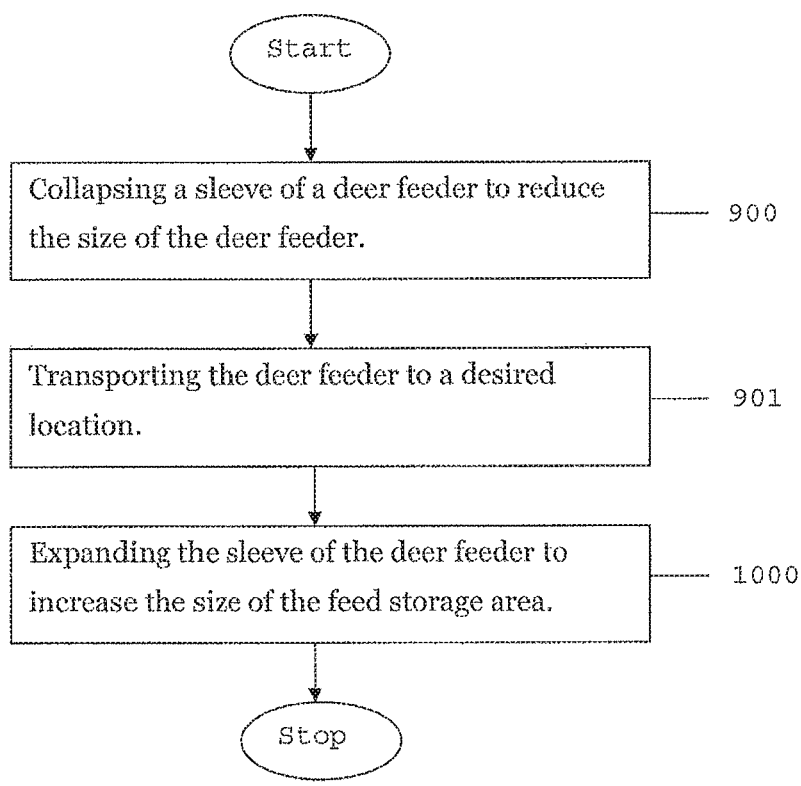
FIG. 10 shows a flowchart for another possible method of practicing the present invention.

Another method for practicing the invention is shown in FIG. 10. This method adds the additional step of once the end user has moved the deer feeder 100 to the desired hunting location, the end user may mount the deer feeder 100 in a vertical position so that the collapsible sleeve 150 is fully extended, i.e., not collapsed (as shown in FIG. 1). (Step 1000) The deer feeder 100 may be mounted to a tree, hung from a branch of a tree, or support members 170 may be attached to the upper enclosure 105 of the deer feeder 100 to position the deer feeder 100 in a vertical position. Once the deer feeder 100 is in a vertical position, gravity will pull the collapsible sleeve 150 to an extended, i.e., open position, thereby increasing the size of the feed storage area 500 within the deer feeder 100. Once the collapsible sleeve 150 is in the extended or opened position, feed may be added to the feed storage area 500.

Although the present invention has been described with respect to preferred embodiment(s), any person skilled in the art will recognize that changes may be made in form and detail, and equivalents may be substituted for elements of the invention without departing from the spirit and scope of the invention. As an example, while the invention has been referred to as a deer feeder 100 used by a hunter, the invention may also be used with any type of wild game or livestock and by a rancher or any other person who wishes to attract game or livestock to a selected area. Therefore, it is intended that the invention not be limited to the particular embodiments disclosed for carrying out this invention, but will include all embodiments falling within the scope of the appended claims.

What is claimed is:

1. A method for transporting a deer feeder, comprising:
    collapsing a collapsible sleeve of a deer feeder to reduce the size of the deer feeder;
    the deer feeder comprising:
        an upper enclosure;
        the collapsible sleeve having a top opening at an upper portion thereof and a bottom opening at a bottom portion thereof;
        a bottom enclosure comprising an access port;
        wherein the upper enclosure, the collapsible sleeve and the bottom enclosure form a feed storage area for storing feed therein,
        wherein the collapsible sleeve is positioned between the upper enclosure and the bottom enclosure such that the collapsible sleeve, at the upper portion thereof, is connected to the upper enclosure and the collapsible sleeve, at the bottom portion thereof, is connected to the bottom enclosure;
        an upper coupler constructed and arranged to connect the upper enclosure with the collapsible sleeve, the upper coupler constructed and arranged to support the weight of the feed in the feed storage area;
        one or more connector structures constructed and arranged to be attached to the upper enclosure and to support the deer feeder in a vertical position during use; and
        feed distribution mechanism attached to the bottom enclosure, wherein the feed distribution mechanism is constructed and arranged to receive the feed from the feed storage area through the access port of the bottom enclosure and distribute the feed from the feed storage area to an area around the deer feeder; and
    transporting the deer feeder to a desired location.

2. The method of claim 1, wherein the top opening of the collapsible sleeve is attached to an inner wall of the upper enclosure using an upper seal member to form a watertight upper connection between the upper enclosure and collapsible sleeve.

3. The method of claim 1, wherein the bottom opening of the collapsible sleeve is attached to an outer wall of the bottom enclosure using a lower seal member to form a watertight lower connection between the bottom enclosure and collapsible sleeve.

4. The method of claim 1, wherein the upper enclosure, the collapsible sleeve, and the bottom enclosure form the feed storage area that is rainproof.

5. The method of claim 1, further comprising expanding the collapsible sleeve of the deer feeder to increase the size of the feed storage area.

6. A deer feeder, comprising:
    an upper enclosure;
    a collapsible sleeve having a top opening at an upper portion thereof and a bottom opening at a bottom portion thereof;
    a bottom enclosure comprising an access port;
    wherein the upper enclosure, the collapsible sleeve and the bottom enclosure form a feed storage area for storing feed therein,
    wherein the collapsible sleeve is positioned between the upper enclosure and the bottom enclosure such that the collapsible sleeve, at the upper portion thereof, is connected to the upper enclosure and the collapsible sleeve, at the bottom portion thereof, is connected to the bottom enclosure;
    an upper coupler constructed and arranged to connect the upper enclosure with the collapsible sleeve, the upper coupler constructed and arranged to support the weight of the feed in the feed storage area;
    one or more connector structures constructed and arranged to be attached to the upper enclosure and to support the deer feeder in a vertical position during use; and
    a feed distribution mechanism attached to the bottom enclosure, wherein the feed distribution mechanism is constructed and arranged to receive the feed from the feed storage area through the access port of the bottom enclosure and distribute the feed from the feed storage area to an area around the deer feeder.

7. The deer feeder of claim 6, wherein the collapsible sleeve, at the upper portion thereof, is attached to an inner wall of the upper enclosure using an upper seal member.

8. The deer feeder of claim 7, wherein the upper seal member is constructed and arranged to provide a water tight seal connection between the collapsible sleeve and the upper enclosure.

9. The deer feeder of claim 6, wherein the collapsible sleeve, at the bottom portion thereof, is attached to an outer wall of the bottom enclosure using a lower seal member.

10. The deer feeder of claim 9, wherein the lower seal member is constructed and arranged to provide a water tight seal connection between the collapsible sleeve and the bottom enclosure.

11. The deer feeder of claim 6, further comprising a removable cover, wherein the removable cover is constructed and arranged to be removably connected to the upper enclosure such that the removable cover is removed from the deer feeder to add feed to the feed storage area and the removable cover is connected to the deer feeder to make the feed storage area substantially water proof.

12. The deer feeder of claim 11, wherein the removable cover is constructed and arranged to be removably connected to the upper enclosure using an attachment member.

13. The deer feeder of claim 12, wherein the attachment member is a clamp.

14. The deer feeder of claim 6, wherein the upper coupler comprises an upper support member, wherein the collapsible sleeve, at the upper portion thereof, is folded over the upper support member and into the feed storage area and the collapsible sleeve is attached to itself inside the feed storage area, and wherein the upper support member is constructed and arranged to support the weight of the feed in the feed storage area.

15. The deer feeder of claim 14, wherein the upper coupler further comprises an upper holder member constructed and arranged to hold the collapsible sleeve and the upper support member in place, and wherein the upper coupler also comprises one or more upper connection members constructed and arranged to connect the collapsible sleeve and the upper enclosure.

16. The deer feeder of claim 6, further comprising a bottom coupler constructed and arranged to connect the bottom enclosure with the collapsible sleeve, wherein the bottom coupler comprises a bottom support member, wherein the collapsible sleeve, at the bottom portion thereof, is folded over the bottom support member and the collapsible sleeve is attached to itself outside the feed storage area, and wherein the bottom support member is constructed and arranged to support the weight of the feed in the feed storage area.

17. The deer feeder of claim 16, wherein the bottom coupler further comprises a bottom holder member constructed and arranged to hold the collapsible sleeve and the bottom support member in place, and wherein the bottom coupler also comprises one or more bottom connection members constructed and arranged to connect the collapsible sleeve and the bottom enclosure.

18. The deer feeder of claim 16, wherein the bottom coupler further comprises a bottom seal member constructed and arranged to be connected with the collapsible sleeve and the bottom enclosure.

19. The deer feeder of claim 6, wherein the access port of the bottom enclosure is constructed and arranged to allow feed from the feed storage area to travel to the feed distribution mechanism.

20. The deer feeder of claim 6, wherein the one or more connector structures are constructed and arranged to engage with one or more corresponding support members to hold the deer feeder in the vertical position during use.

21. The deer feeder of claim 6, wherein the feed distribution mechanism comprises an auger for extracting the feed from the feed storage area and/or a centrifugal force mechanism constructed and arranged to distribute the feed around the deer feeder.

* * * * *